(12) United States Patent
Lee et al.

(10) Patent No.: US 10,567,562 B2
(45) Date of Patent: Feb. 18, 2020

(54) MOBILE TERMINAL

(71) Applicant: LG ELECTRONICS INC., Seoul (KR)

(72) Inventors: Byunghwa Lee, Seoul (KR); Choonghwan Shin, Seoul (KR); Heejong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/465,078

(22) PCT Filed: Nov. 30, 2016

(86) PCT No.: PCT/KR2016/013977
§ 371 (c)(1),
(2) Date: May 29, 2019

(87) PCT Pub. No.: WO2018/101508
PCT Pub. Date: Jun. 7, 2018

(65) Prior Publication Data
US 2019/0297176 A1    Sep. 26, 2019

(51) Int. Cl.
*H04M 1/02* (2006.01)
*G06F 3/01* (2006.01)
*H04M 1/725* (2006.01)

(52) U.S. Cl.
CPC .......... *H04M 1/0277* (2013.01); *G06F 3/016* (2013.01); *H04M 1/02* (2013.01); *H04M 1/0266* (2013.01); *H04M 1/725* (2013.01); *H04M 2001/0204* (2013.01)

(58) Field of Classification Search
CPC ...... H04M 1/0277; H04M 1/725; H04M 1/02; H04M 1/0266; H04M 2001/0204; H04M 2250/22; H04M 1/72519; H04M 1/0262; H04M 1/0249; H04M 1/02777; G06F 3/016
See application file for complete search history.

(56) References Cited

U.S. PATENT DOCUMENTS

2011/0053666 A1*  3/2011  Kang ............... H04M 1/02
                                                   455/575.6
2012/0081337 A1*  4/2012  Camp, Jr. ........ G06F 3/0436
                                                   345/177

(Continued)

FOREIGN PATENT DOCUMENTS

KR    10-2008-0029292 A    4/2008
KR    10-2010-0066676 A    6/2010

(Continued)

*Primary Examiner* — Brandon J Miller
(74) *Attorney, Agent, or Firm* — Birch, Stewart, Kolasch & Birch, LLP

(57) ABSTRACT

The present invention provides a mobile terminal comprising: a terminal body formed to have a first direction as a length direction; a circuit board arranged inside the terminal body and extending along the first direction; first and second batteries arranged inside the terminal body are so as to be spaced apart from each other with the circuit board disposed therebetween; first and second vibration modules arranged so as to be adjacent to both ends of the circuit board; and a control unit for independently controlling the first and second vibration modules.

9 Claims, 12 Drawing Sheets

(56) References Cited

U.S. PATENT DOCUMENTS

| | | | |
|---|---|---|---|
| 2014/0082491 A1* | 3/2014 | Adachi | G06F 3/0488 |
| | | | 715/702 |
| 2015/0153829 A1* | 6/2015 | Shiraishi | G06F 1/1626 |
| | | | 345/173 |
| 2015/0195630 A1* | 7/2015 | Yliaho | H04M 1/0266 |
| | | | 381/162 |
| 2015/0235531 A1* | 8/2015 | Lee | G08B 6/00 |
| | | | 340/407.1 |
| 2016/0078278 A1* | 3/2016 | Moore | G06K 9/00201 |
| | | | 345/8 |
| 2018/0356926 A1* | 12/2018 | Park | G06F 3/016 |

FOREIGN PATENT DOCUMENTS

| | | |
|---|---|---|
| KR | 10-2012-0090732 A | 8/2012 |
| KR | 10-1523796 B1 | 5/2015 |
| KR | 10-2016-0086174 A | 7/2016 |

* cited by examiner

MOBILE TERMINAL

CROSS REFERENCE TO RELATED APPLICATIONS

This application is the National Phase of PCT/KR2016/013977 filed on Nov. 30, 2016, which is hereby expressly incorporated by reference into the present application.

TECHNICAL FIELD

The present invention relates to a mobile terminal configured to output vibrations.

BACKGROUND ART

Terminals may be divided into mobile/portable terminals and stationary terminals according to mobility. Also, the mobile terminals may be classified into handheld types and vehicle mount types according to whether or not a user can directly carry.

The terminal has various functions according to development of technologies. For example, a mobile terminal can be allowed to capture still images or moving images, play music or video files, play games, receive broadcast and the like, so as to be implemented as an integrated multimedia player. Efforts are ongoing to support and increase the functionality of terminals. Such efforts include software improvements, as well as changes and improvements in the structural components.

As an emotional function for emphasizing interaction between a mobile terminal function and a user has been developed, a haptic module function for generating a vibration upon inputting a control command through a touch by the user has been developed. However, as the mobile terminal is available in a variety of sizes, it is difficult to output a uniform vibration using just one vibration module disposed in one region of the mobile terminal, and to realize various vibration patterns corresponding to various functions.

DETAILED DESCRIPTION OF THE DISCLOSURE

One aspect of the present invention is to provide a mobile terminal having a haptic module for efficiently outputting various vibration patterns.

In order to achieve this and other aspects of the present invention, there is provided a mobile terminal, including a terminal body having a first direction as a length direction, a circuit board disposed inside the terminal body and extending along the first direction, first and second batteries arranged inside the terminal body so as to be spaced apart from each other with the circuit board interposed therebetween, first and second vibration modules arranged so as to be adjacent to both ends of the circuit board, and a control unit configured to independently control the first and the second vibration modules.

In one embodiment of the present invention, the mobile terminal may further include a display unit formed on one surface of the terminal body, receiving a touch input, and divided into a first region and a second region. The first vibration module and the second vibration module may be disposed in the terminal body corresponding to the first region and the second region, and the control unit may control the first and second vibration modules to output vibrations based on a touch input applied to at least one of the first region and the second region so that a user can feel a tactile sense with respect to a reaction to the applied control command through vibration output in different directions.

In one embodiment of the present invention, the control unit may control the first and second vibration modules to output vibrations with different intensities and directions based on a position and a direction of a touch input applied to specific screen information, which can give a fun to a user as a vibration is output differently according to a touch input applied to a display unit, or allow the user to sense a function according to a control command in a tactile manner.

Effects of the Disclosure

According to an embodiment of the present invention, since a plurality of haptic modules is disposed to be spaced apart from each other in the terminal body, a uniform vibration can be felt (transmitted) in the entire area of the mobile terminal to which a relatively wide display unit is applied.

In addition, since a plurality of haptic modules can be arranged in different directions, various vibration patterns can be implemented so as to correspond to a specific control command.

BEST MODE OF THE DISCLOSURE

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
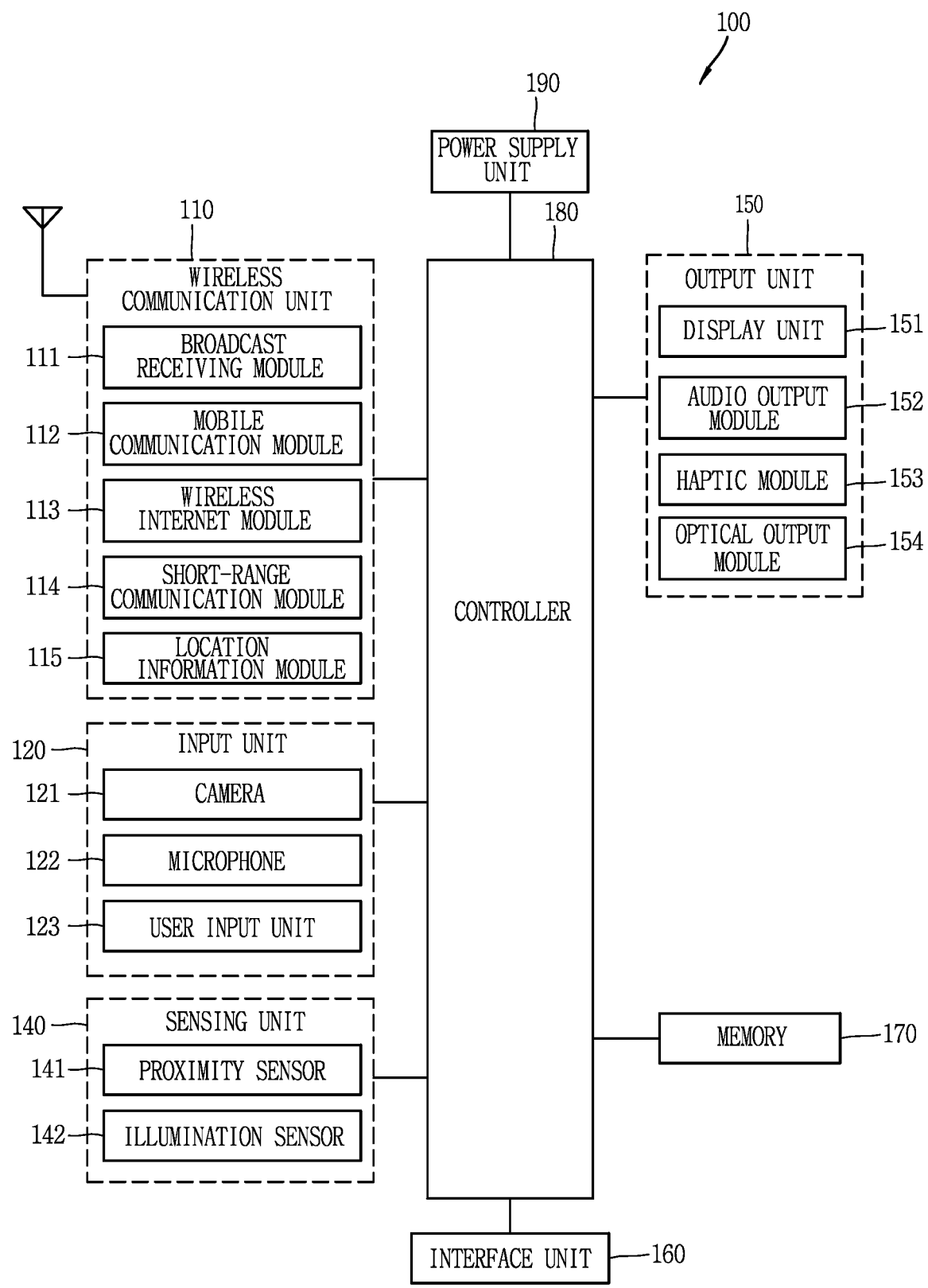
FIG. 1A is a block diagram of a mobile terminal in accordance with one embodiment of the present invention.

FIG. 1A is a block diagram of a mobile terminal 100 in accordance with one exemplary embodiment of the present invention.

The mobile terminal 100 may be shown having components such as a wireless communication unit 110, an input unit 120, a sensing unit 140, an output unit 150, an interface unit 160, a memory 170, a controller (control unit) 180, and a power supply unit 190. FIG. 1 shows the mobile terminal 100 having various components, but it may be understood that implementing all of the illustrated components is not a requirement. Greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, or communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal 100, the surrounding environment of the mobile terminal 100, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to implement a touch screen. The touch screen may function as the user input unit 123 which provides an input interface between the mobile terminal 100 and the user and simultaneously provide an output interface between the mobile terminal 100 and a user.

The interface unit 160 serves as an interface with various types of external devices that are coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control an overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1A, to execute an application program that have been stored in the memory 170. In addition, the controller 180 may control at least two of those components included in the mobile terminal 100 to activate the application program.

The power supply unit 190 may be configured to receive external power or provide internal power in order to supply appropriate power required for operating elements and components included in the wearable device 100, under the control of the controller 180. The power supply unit 190 may include a battery, and the battery may be configured as an embedded battery or a detachable battery.

At least part of the components may cooperatively operate to implement an operation, a control or a control method of the mobile terminal 100 according to various embodiments disclosed herein. Also, the operation, the control or the control method of the mobile terminal 100 may be implemented on electronic device by an activation of at least one application program stored in the memory 170.

Hereinafter, description will be given in more detail of the aforementioned components with reference to FIG. 1, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneous reception of two or more broadcast channels, or to support switching among broadcast channels.

The mobile communication module 112 may transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless signal may include various types of data depending on a voice call signal, a video call signal, or a text/multimedia message transmission/reception.

The wireless Internet module 113 refers to a module for wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another electronic device may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal 100. As an example, the location information module 115 includes a Global Position System (GPS) module, a Wi-Fi module, or both. For example, when the mobile terminal 100 uses a GPS module, a position of the mobile terminal 100 may be acquired using a signal sent from a GPS satellite. As another example, when the mobile terminal 100 uses the Wi-Fi module, a position of the mobile terminal 100 may be acquired based on information related to a wireless access point (AP) which transmits or receives a wireless signal to or from the Wi-Fi module. If desired, the location information module 115 may alternatively or additionally perform a function of any of the other modules of the wireless communication unit 110 to obtain data related to the position of the mobile terminal 100. The location information module 115 is a module used for acquiring the position (or the current position) of the mobile terminal 100, and may not be limited to a module for directly calculating or acquiring the position of the electronic device.

Next, the input unit 120 is for inputting image information (or signal), audio information (or signal), data, or information input from a user. For inputting image information, the mobile terminal 100 may be provided with a plurality of cameras 121. Such cameras 121 may process image frames of still pictures or video obtained by image sensors in a video or image capture mode. The processed image frames can be displayed on the display unit 151 or stored in memory 170. Meanwhile, the cameras 121 provided in the mobile terminal 100 may be arranged in a matrix configuration to permit a plurality of image information having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the electronic device at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal 100, surrounding environment information of the mobile terminal 100, user information, or the like, and generates a corresponding sensing signal. The controller 180 generally cooperates with the sending unit 140 to control operations of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal 100 covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, the controller 180 may process data corresponding to proximity touches and proximity touch patterns sensed by the proximity sensor 141, and cause visual information corresponding to the processed data to be output on the touch screen. In addition, the controller 180 can control the mobile terminal 100 to execute different operations or process different data (or information) according to whether a touch with respect to a point on the touch screen is either a proximity touch or a contact touch.

A touch sensor senses a touch (or a touch input) applied to the touch screen (or the display unit 151) using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the touch screen, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the object in vicinity of the touch screen. In more detail, the photo sensor may include photo diodes and transistors (TRs) at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 may receive audio data from the wireless communication unit 110 or output audio data stored in the memory 170 during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceives, or otherwise experiences. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 may output a signal for indicating an event generation using light of a light source of the mobile terminal 100. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal 100 emits monochromatic light or light with a plurality of colors to a front or rear surface. The signal output may be terminated as the mobile terminal 100 senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the mobile terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control operations relating to application programs and the general operations of the mobile terminal 100. For example, the controller 180 may set or release a lock state for restricting a user from inputting a control command with respect to applications when a status of the mobile terminal 100 meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the wearable device 100 under the control of the controller 180. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Hereinafter, description will be given of a structure of the mobile terminal 100 according to the one embodiment of the present invention illustrated in FIG. 1A or a terminal having those components, with reference to FIG. 1C.

Figure 1B:
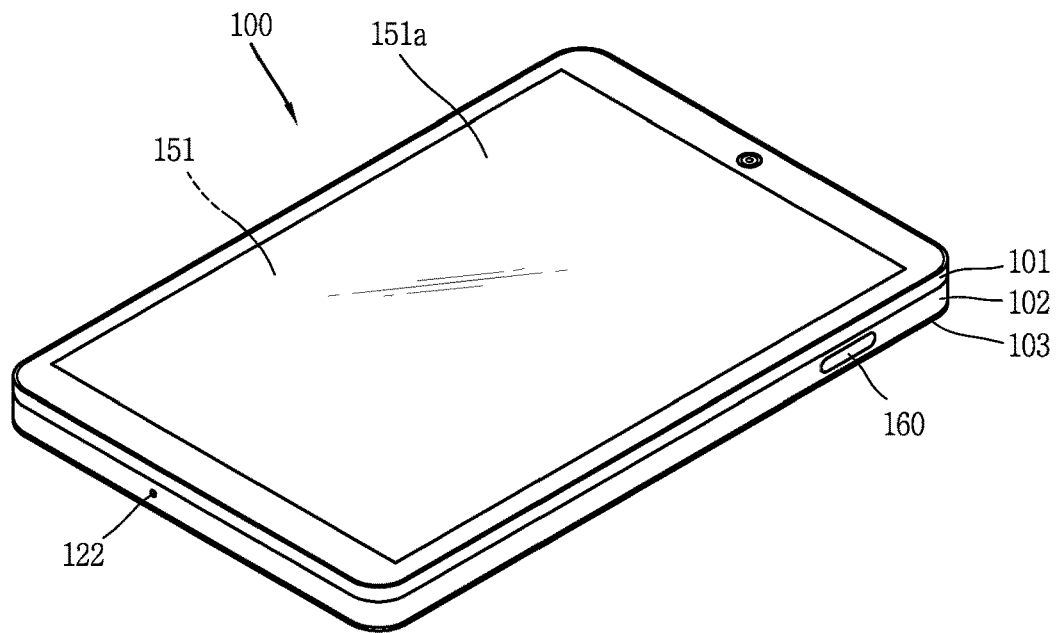
FIGS. 1B and 1C are conceptual views illustrating one example of a mobile terminal according to the present invention, viewed from different directions.
Figure 1C:
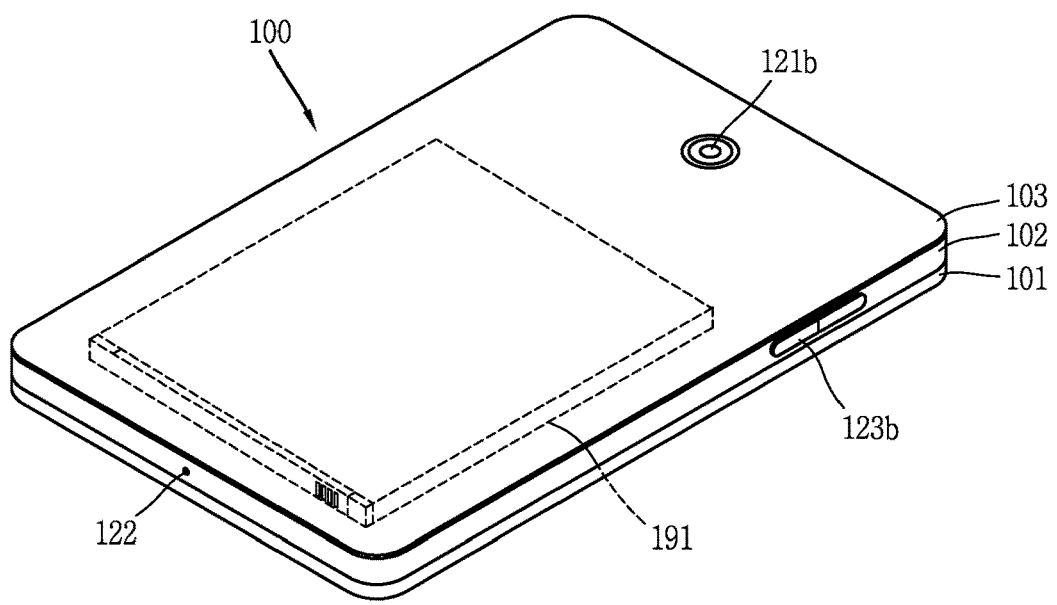

Referring to FIGS. 1B and 1C, the disclosed mobile terminal 100 includes a bar-like terminal body. However, the mobile terminal 100 may alternatively be implemented in any of a variety of different configurations. Examples of such configurations include watch type, clip-type, glasses-type, or a folder-type, flip-type, slide-type, swing-type, and swivel-type in which two and more bodies are combined with each other in a relatively movable manner, and combinations thereof. Discussion herein will often relate to a particular type of mobile terminal. However, such teachings with regard to a particular type of mobile terminal will generally be applied to other types of mobile terminals as well.

Here, considering the mobile terminal 100 as at least one assembly, the terminal body may be understood as a conception referring to the assembly.

The mobile terminal 100 will generally include a case (for example, frame, housing, cover, and the like) forming the appearance of the terminal. In this embodiment, the case is formed using a front case 101 and a rear case 102. Various electronic components are interposed into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. In this case, a rear cover 103 is shown covering the electronic components, and this cover may be detachably coupled to the rear case 102. Therefore, when the rear cover 103 is detached from the rear case 102, the electronic components mounted on the rear case 102 are exposed to the outside.

As illustrated, when the rear cover 103 is coupled to the rear case 102, a side surface of the rear case 102 may partially be exposed. In some cases, upon the coupling, the rear case 102 may also be completely shielded by the rear cover 103. Meanwhile, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases forms an inner space for accommodating components, the mobile terminal 100 may be configured such that one case forms the inner space. In this case, a mobile terminal 100 having a uni-body is formed in such a manner that synthetic resin or metal extends from a side surface to a rear surface.

Meanwhile, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display module 151 may include at least one of a liquid crystal display (LCD), a thin film transistor-LCD (TFT LCD), an organic light-emitting diode (OLED), a flexible display, a three-dimensional (3D) display and an e-ink display.

The display unit 151 may be implemented using two display devices, according to the configuration type thereof. For instance, a plurality of the display units 151 may be arranged on one side, either spaced apart from each other, or these devices may be integrated, or these devices may be arranged on different surfaces.

The display unit 151 may include a touch sensor that senses a touch with respect to the display unit 151 so as to receive a control command in a touch manner. Accordingly, when a touch is applied to the display unit 151, the touch sensor may sense the touch, and a controller 180 may generate a control command corresponding to the touch. Contents input in the touch manner may be characters, numbers, instructions in various modes, or a menu item that can be designated.

On the other hand, the touch sensor may be configured in a form of a film having a touch pattern and disposed between a window and a display (not illustrated) on a rear surface of the window, or may be a metal wire directly patterned on the rear surface of the window. Alternatively, the touch sensor may be formed integrally with the display. For example, the touch sensor may be disposed on a substrate of the display, or may be provided inside the display.

In this way, the display unit 151 may form a touch screen together with the touch sensor, and in this case, the touch screen may function as the user input unit (123, see FIG. 1A). In some cases, the touch screen may replace at least some of functions of a first manipulation unit 123a.

The first audio output module 152a may be implemented as a receiver for transmitting a call sound to a user's ear and the second audio output module 152b may be implemented as a loud speaker for outputting various alarm sounds or multimedia reproduction request sounds.

The window 151a of the display unit 151 may include a sound hole for emitting sounds generated from the first audio output module 152a. However, the present invention is not limited thereto, and the sounds may be released along an assembly gap between the structural bodies (for example, a gap between the window 151a and the front case 101). In this case, a hole independently formed to output audio sounds may not be seen or may otherwise be hidden in terms of appearance, thereby further simplifying the appearance of the mobile terminal 100.

The optical output module 154 may be configured to output light for indicating an event generation. Examples of such events may include a message reception, a call signal reception, a missed call, an alarm, a schedule alarm, an email reception, information reception through an application, and the like. When a user has checked a generated event, the controller 180 may control the optical output module 154 to stop the light output.

The first camera 121a may process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion. The first and second manipulation units 123a and 123b may employ any method if it is a tactile manner allowing the user to perform manipulation with a tactile feeling such as touch, push, scroll or the like. The first and second manipulation units 123a and 123b may also be manipulated through a proximity touch, a hovering touch, and the like, without a user's tactile feeling.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

On the other hand, the mobile terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be configured to receive the user's voice, other sounds, and the like. The microphone 122 may be provided at a plurality of places, and configured to receive stereo sounds.

The interface unit 160 may serve as a path allowing the mobile terminal 100 to interface with external devices. For example, the interface unit 160 may be at least one of a connection terminal for connecting to another device (for example, an earphone, an external speaker, or the like), a port for near field communication (for example, an Infrared DaAssociation (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121*b* may be further mounted to the rear surface of the terminal body. The second camera 121*b* may have an image capturing direction, which is substantially opposite to the direction of the first camera unit 121*a*.

The second camera 121*b* may include a plurality of lenses arranged along at least one line. The plurality of lenses may be arranged in a matrix form. The cameras may be referred to as an 'array camera.' When the second camera 121*b* is implemented as the array camera, images may be captured in various manners using the plurality of lenses and images with better qualities may be obtained.

The flash 124 may be disposed adjacent to the second camera 121*b*. When an image of a subject is captured with the camera 121*b*, the flash 124 may illuminate the subject.

The second audio output module 152*b* may further be disposed on the terminal body. The second audio output module 152*b* may implement stereophonic sound functions in conjunction with the first audio output module 152*a*, and may be also used for implementing a speaker phone mode for call communication.

At least one antenna for wireless communication may be disposed on the terminal body. The antenna may be embedded in the terminal body or formed in the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

The terminal body is provided with a power supply unit 190 (see FIG. 1A) for supplying power to the mobile terminal 100. The power supply unit 190 may include a batter 191 which is mounted in the terminal body or detachably coupled to an outside of the terminal body.

The battery 191 may receive power via a power cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

Hereinafter, embodiments related to a control method that can be implemented in a mobile terminal configured as above will be described with reference to the accompanying drawings. It will be apparent to those skilled in the art that the present invention may be embodied in other specific forms without departing from the spirit or essential characteristics thereof.

The haptic module 153 of a mobile terminal 100 according to the present invention includes a plurality of vibration modules. The plurality of vibration modules is driven independently or interacting with each other by a control command. Hereinafter, an arrangement structure of the plurality of vibration modules will be described.

Figure 2A:
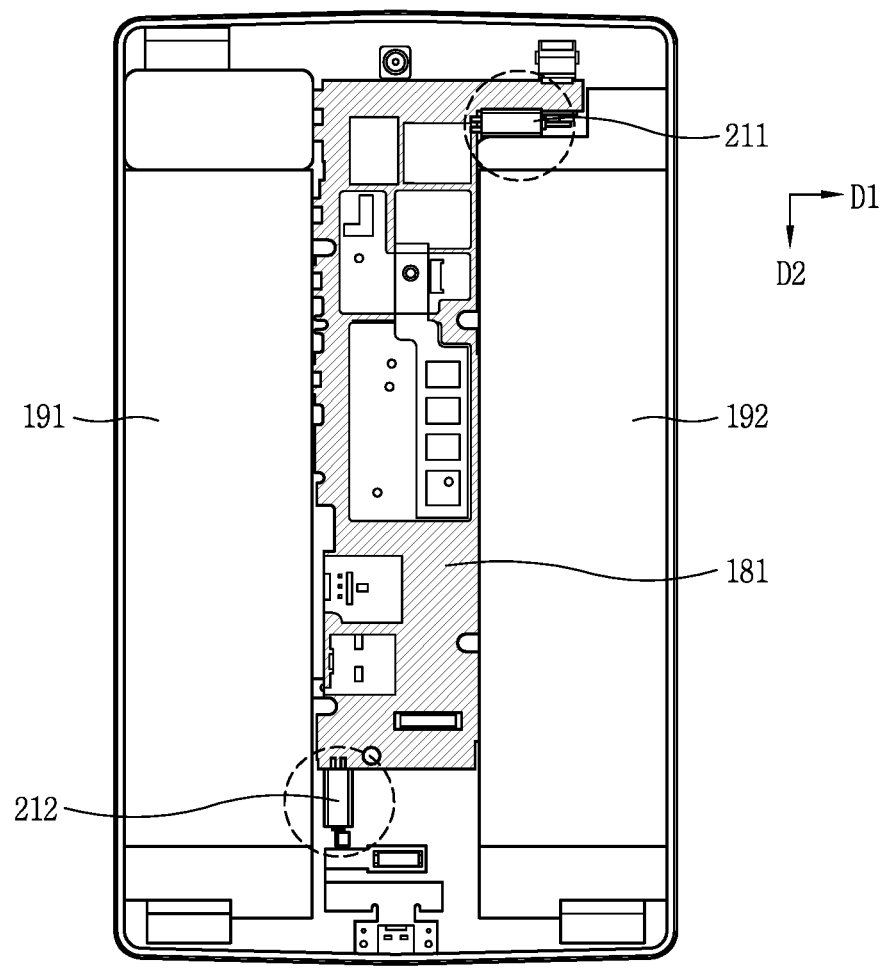
FIG. 2A is a conceptual view illustrating an arrangement structure of first and second vibration modules.

FIG. 2A is a conceptual view illustrating an arrangement structure of first and second vibration modules.

FIG. 2A is an exploded view of the mobile terminal 100 in which the display unit 151 is separated for explaining placement of first and second vibration modules 211, 212.

A first battery 191 and a second battery 192 may be disposed on the rear case 102 or an inner frame of the mobile terminal 100. The first and second batteries 191, 192 may have substantially the same size and supply power to the mobile terminal 100. The first and second batteries 191, 192 having a shape extending in a second direction D2, which is an output direction of the display unit 151, are arranged in a first direction D1 intersecting the second direction D2.

A circuit board 181 is disposed between the first battery 191 and the second battery 192. A terminal connected to the first and second batteries 191, 192 and a plurality of terminals electrically connected to a plurality of electronic components may be disposed on the circuit board 181. The circuit board 181 disposed between the first battery 191 and the second battery 192 may have a shape extending along the second direction D2.

The first and second vibration modules 211, 212 are electrically connected to the circuit board 181, and are spaced apart from each other. For example, the first vibration module 211 is disposed close to one end of the terminal body 100, and the second vibration module 212 is disposed close to another end of the terminal body 100, which is spaced apart toward the second direction D2. That is, the first and second vibration modules 211, 212 are disposed at both ends of the circuit board 181. Also, the first vibration module 211 is arranged along the first direction, and the second vibration module is arranged along the second direction D2.

The first and the second vibration modules 211, 212 are arranged in different directions so as to output vibrations in different directions. In addition, since the first and second vibration modules 211, 212 are spaced apart from each other in a diagonal direction of the mobile terminal, a region of the mobile terminal body 100 through which vibration is transmitted may be maximized.

Also, a vibration module corresponding to a region partitioned by the display unit 151 vibrates so as to output the maximum vibration with minimum power.

In addition, since the first and second vibration modules 211, 212 are disposed adjacent to the first battery 191 and the second battery 192, respectively, which are spaced apart from each other, a more balanced vibration may be provided to a user even if a pair of relatively large batteries are present.

Figure 2B:
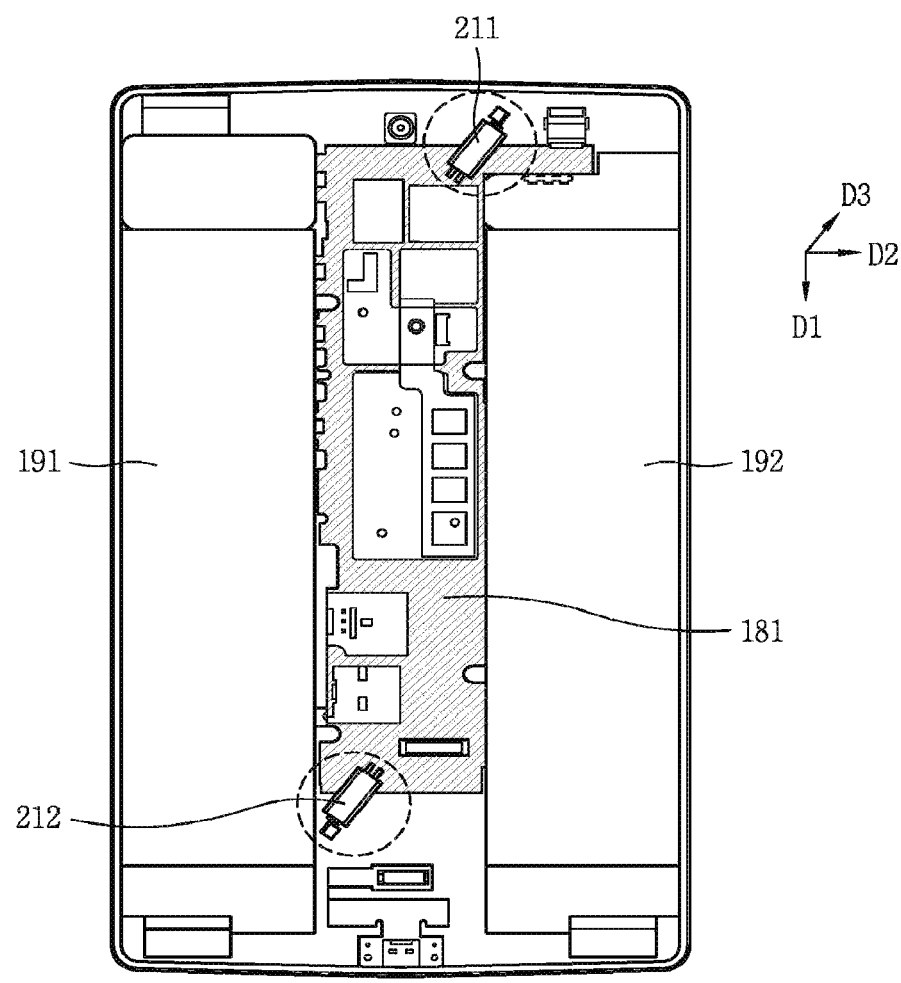
FIGS. 2B to 2D are conceptual views illustrating an arrangement structure of first and second vibration modules.
Figure 2C:
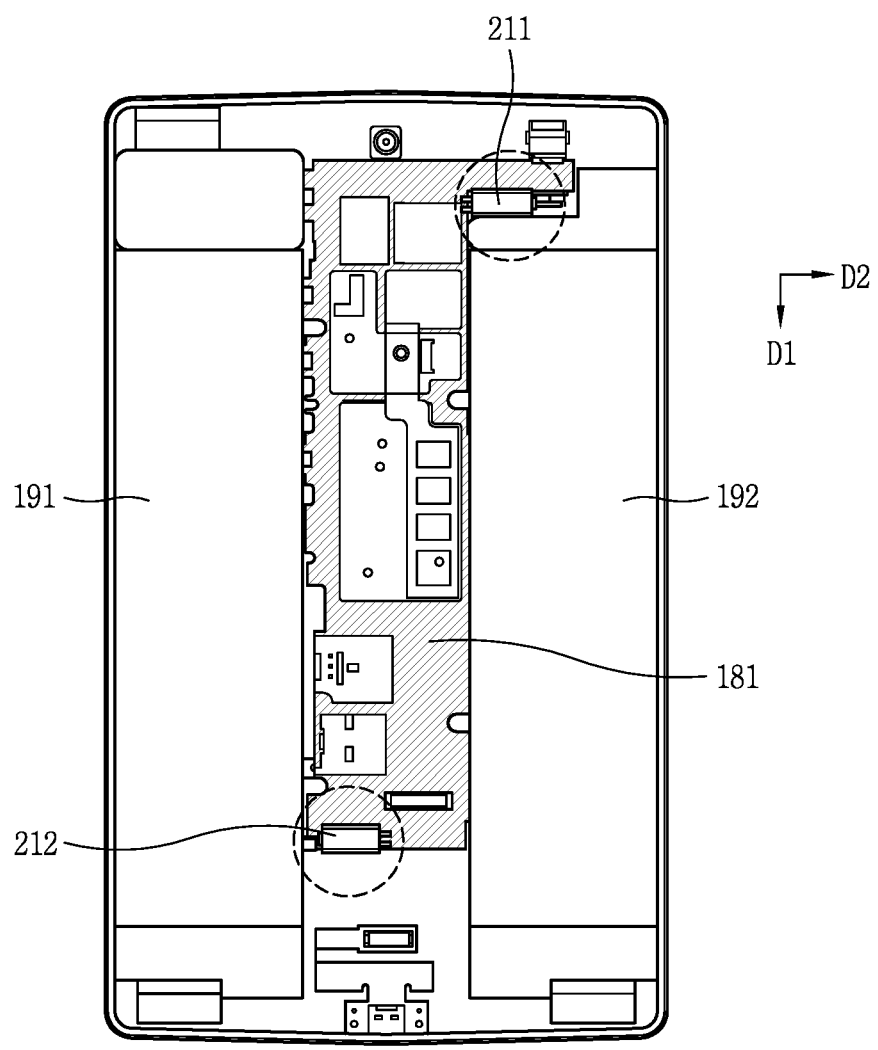
Figure 2D:
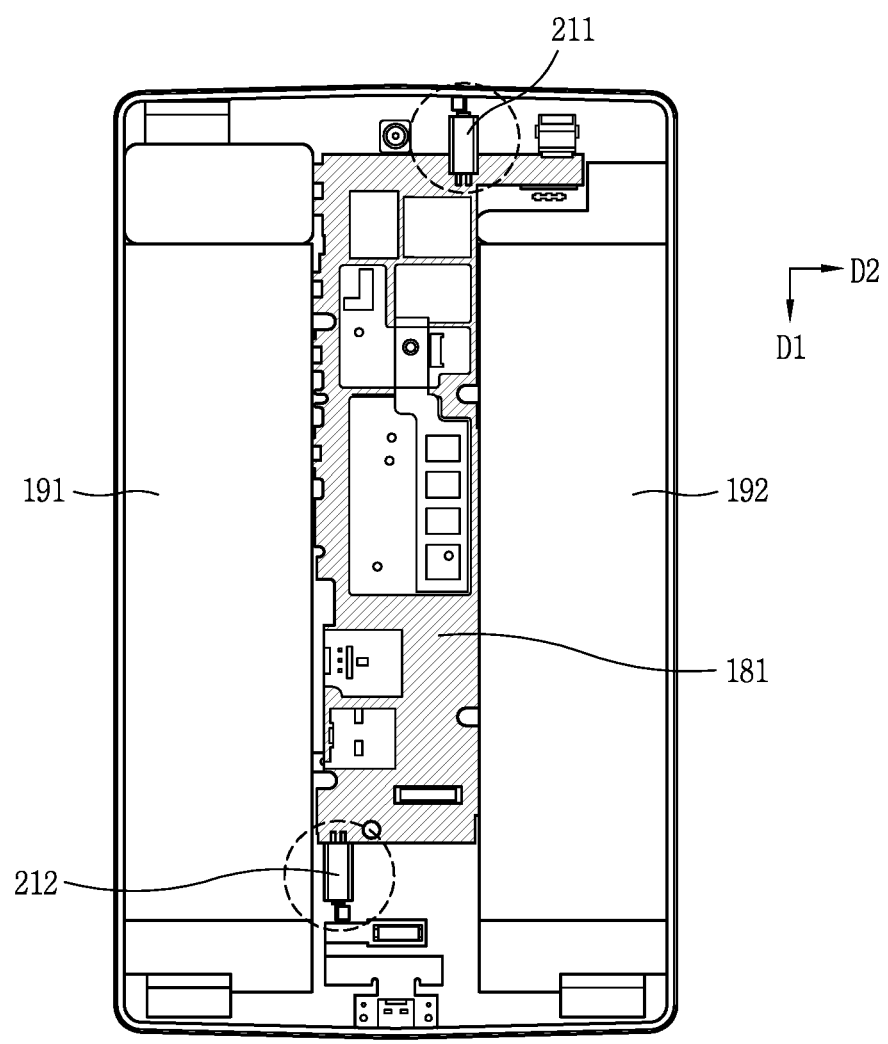

FIGS. 2B to 2D are conceptual views illustrating an arrangement structure of first and second vibration modules.

Referring to FIG. 2B, the first and second vibration modules 211, 212 are arranged in a third direction D3 intersecting the first direction D1 and the second direction D2. The third direction D3 may correspond to a diagonal direction of the display unit 151. The first and second vibration modules 211, 212 are disposed at both ends of the circuit board 181, and arranged in substantially the same direction. Accordingly, vibrations may be output in the same direction by the first and second vibration modules 211, 212.

The first and second vibration modules 211, 212 are arranged in the third direction D3 so as to be in direct contact with the inner frame for supporting electronic components of the mobile terminal 100 or the front case 101.

Referring to FIGS. 2C and 2D, the first and second vibration modules 211, 212 may be arranged in substantially the same direction. As shown in FIG. 2C, the first and second vibration modules 211, 212 may be arranged along the second direction D2. As shown in FIG. 2D, the first and second vibration modules 211, 212 may be arranged along the first direction D1.

Alternatively, the first and second vibration modules 211, 212 may be arranged in different directions or in the same direction while maintaining a maximum distance therebetween on the circuit board 181. Accordingly, the first and second vibration modules may be disposed in different directions based on a shape and a width of the display unit 151.

Figure 3:
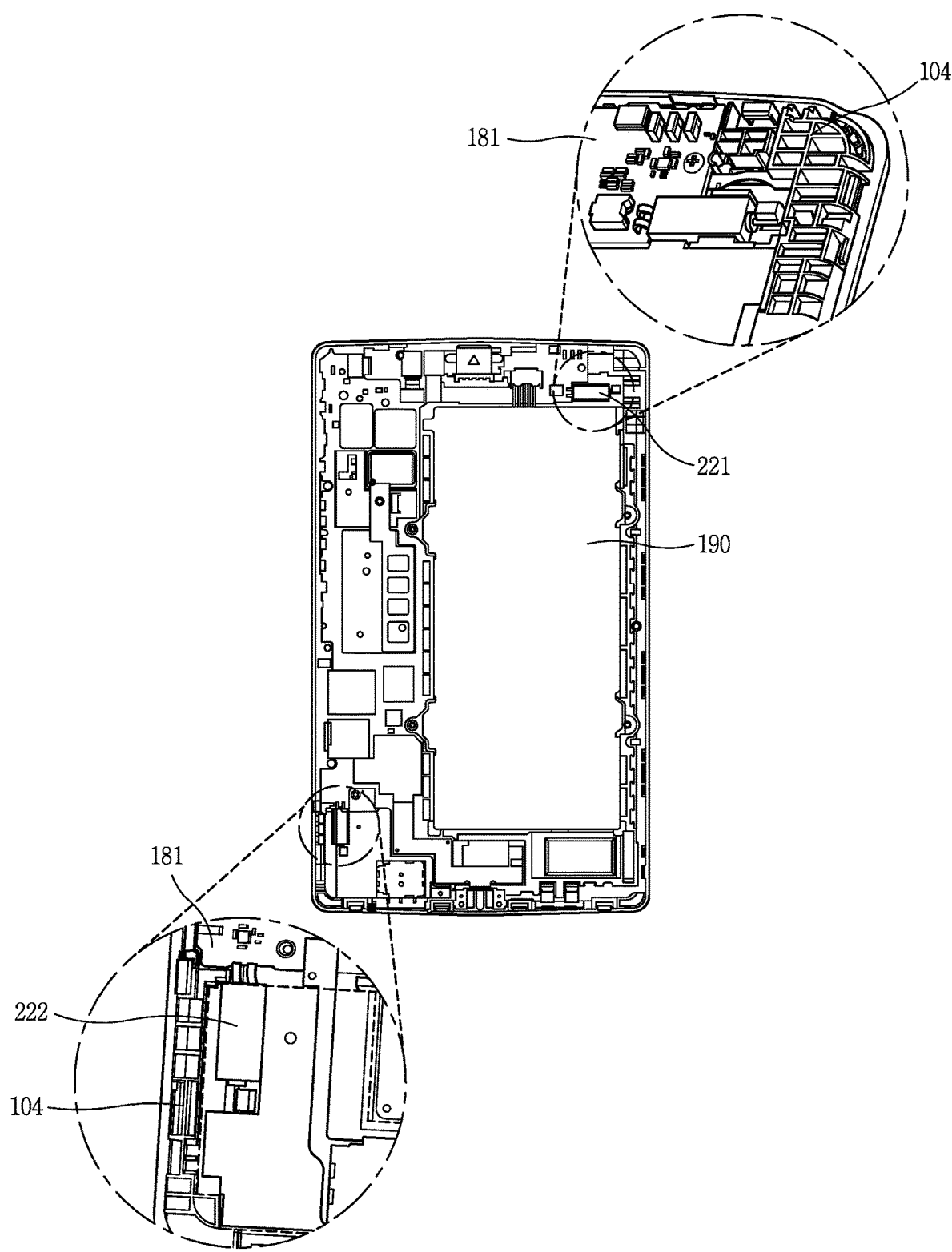
FIG. 3 is a conceptual view illustrating an arrangement structure of first and second vibration modules provided in a mobile terminal when one battery is included.

FIG. 3 is a conceptual view illustrating an arrangement structure of first and second vibration modules provided in a mobile terminal when one battery is included.

Referring to FIG. 3, a battery 190 is disposed on an inner frame 104 for supporting an internal structure of the mobile terminal 100. The battery 190 may be disposed adjacent to one edge of the inner frame 104. Although not shown in the drawing, a storage region for storing the battery 190 may be formed in one region of the inner frame 104.

The circuit board 181 is disposed in the remaining region of the inner frame 104 except the storage region. The first vibration module 221 and the second vibration module 222 are mounted on regions of the circuit board 181, respectively, adjacent to different corners of the mobile terminal 100. The different corners may correspond to corners that are not adjacent to each other. That is, the first and second vibration modules 221, 222 are disposed on the circuit board 181 to be spaced farthest apart from each other.

The first and second vibration modules 221, 222 may be arranged in different directions, but the present invention is not limited thereto. For example, the first and second vibration modules 221, 222 may be arranged parallel to each other.

The first vibration module 221 may be disposed in a region adjacent to the battery 190, and the second vibration module 222 is disposed adjacent to a specific region of the front case 101, which is relatively far from the battery.

In description of the embodiments of the present invention, the mobile terminal 100 includes the first and second vibration modules. However, the number of the vibration modules is not limited.

In more detail, even in the case of a mobile terminal including one battery 190, a plurality of vibration modules may be disposed with some spacing therebetween to evenly output vibrations to the entire region of the mobile terminal. In addition, in case the plurality of vibration modules is arranged in different directions, vibrations may be output in different directions.

A control method for vibration output of a mobile terminal including a plurality of vibration modules arranged with some spacing therebetween will be described below.

FIGS. 4A to 4D are conceptual views illustrating a control method of a mobile terminal in accordance with one embodiment of the present invention.

Figure 4A:
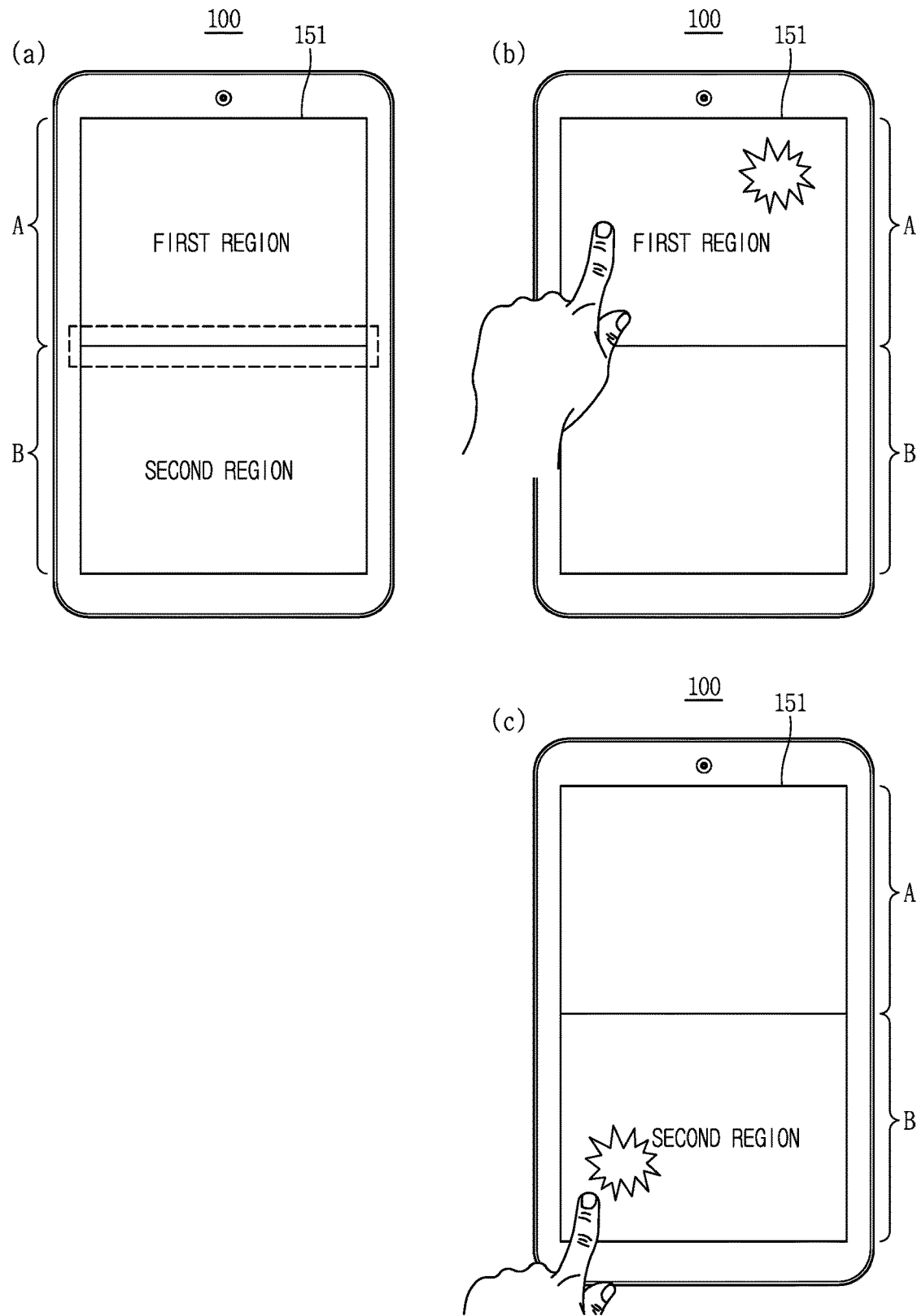
FIGS. 4A to 4D are conceptual views illustrating a control method of a mobile terminal in accordance with one embodiment of the present invention.

Referring to FIGS. 2A and 4A, a mobile terminal 100 according to an embodiment of the present invention includes a first vibration module 211 and a second vibration module 212 spaced apart from each other.

The display unit 151 may be divided into a first region A and a second region B. The first vibration module 211 is disposed adjacent to the first region A, and the second vibration module 212 is disposed adjacent to the second region B.

The controller 180 detects a touch input applied to the display unit 151 and determines which region of the first and second regions A, B corresponds to the touch point. When the touch input is sensed in the first region A, the controller 180 activates the first vibration module 211 to output a vibration. In this case, a vibration is not output from the second vibration module 212.

Meanwhile, when a touch input is sensed in the second region B, the second vibration module 212 may be activated to output a vibration, and the first vibration module 211 may be inactivated.

In addition, when a touch input is sensed in a boundary region between the first and second regions A, B, the controller 180 may control to activate both the first and second vibration modules 211, 212 to output vibrations.

The controller 180 may control a vibration intensity to be substantially equal when one module either the first vibration module 211 or the second vibration module 212 outputs a vibration and when both the first vibration module 211 and the second vibration module 212 output vibrations. That is, when both the first and second vibration modules 211, 212 output vibrations, the output intensity of the first and second vibration modules 211 and 212 may be set smaller than as when one module either the first vibration module 211 or the second vibration module 212 outputs a vibration.

Meanwhile, the boundary region may have a specific area on the display unit.

Since a vibration module disposed adjacent to a user's finger that applies a touch input to the display unit outputs a vibration, the user can feel substantially the same vibration even if a touch input is applied to any region of the display 151.

A method of controlling first and second vibration modules based on a continuous touch input applied to the display unit 151 will be described with reference to FIGS. 2A and 4B.

The display unit 151 according to the present invention is divided into the first region A and the second region B. The first vibration module 211 and the second vibration module 212 are disposed at a position corresponding to the first region A and the second region B respectively.

Figure 4B:
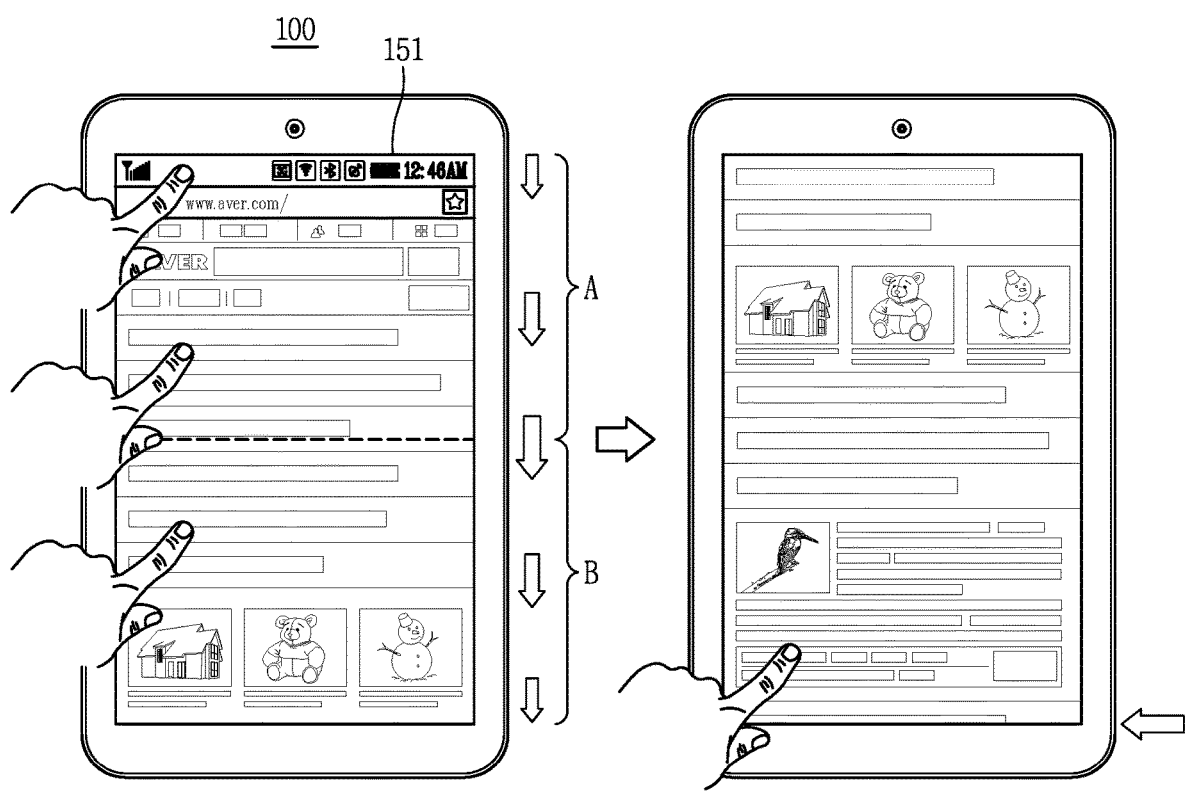

In FIG. 4B, the magnitude of arrows represents the first vibration module 211 corresponding to the first region A or an intensity and a direction of a vibration output from the second vibration module 212. The first and second vibration modules 211, 212 according to the present invention are arranged in different directions inside the terminal body.

The control unit 180 activates the vibration module (first vibration module 211) corresponding to the region (first region A) to which a first touch is applied, and outputs a vibration based on movement of a continuous touch input on the display unit 151. The first vibration module 211 disposed in the first direction D1 outputs a vibration in the first direction D1.

The first vibration module 211 gradually increases the intensity of vibration when the continuous touch input on the display unit 151 moves from the first region A to near the second region B. On the other hand, the controller 180 controls the first vibration module 211 to gradually decrease the intensity of vibration when the continuous touch input moves to the second region B from the first region A.

The controller 180 controls the second vibration module 212 to output a vibration when the touch input is no longer movable in the second region B or when an image to be output by the touch input reaches a limit. The second vibration module 212 outputs a vibration in the second direction D2.

According to an embodiment of the present invention, the user can sense the intensity of vibration which gradually changes when a touch input moving on the display unit is applied. In addition, when a touch input or information output is restricted, vibration output in a direction different from the existing vibration direction can be felt. Accordingly, the user can tactilely sense an execution and restriction of the control command through the different intensity and direction of vibration while applying the control command.

Figure 4C:
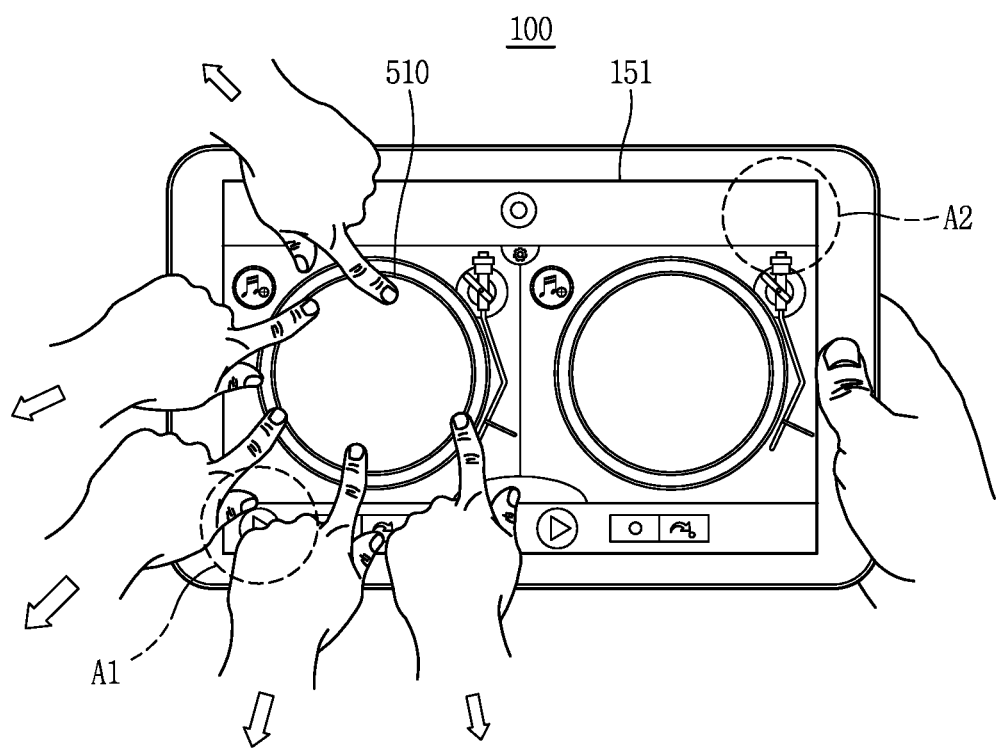

FIG. 4C is a conceptual diagram illustrating a control method for outputting a vibration pattern having directionality through first and second vibration modules that output vibrations in different directions.

Referring to FIGS. 2A and 4C, the display unit 151 outputs screen information 510. The first and the second vibration modules 211, 212 according to an embodiment of the present invention are disposed in the first region A1 and the second region A2, respectively. Arrows illustrated in FIG. 4C correspond to a direction and an intensity of vibration output by the first and second vibration modules 211, 212.

The screen information 510 may include a circular graphic image. The screen information 510 may be changed based on a continuous touch input applied to the graphic image, or the controller 180 may execute a specific function based on the continuous touch input.

For example, the specific function may correspond to an output of specific auditory data based on the continuous touch input.

In addition, the controller 180 controls the first and second vibration modules 211, 212 to output vibrations of different intensities and directions based on the touch point of the touch input applied to the screen information 510.

For example, the touch input is applied along the circular graphic image. The controller controls the first and second vibration modules 211, 212 so as to output vibrations in a direction toward the touch point from a central region of the circular graphic image. In addition, the first and second vibration modules 211, 212 are controlled to output vibrations of different intensities in the central region based on the touch point position of the touch input.

When the control unit 180 differently changes an output intensity of the first and second vibration modules 211, 212, directions of vibration output from the first and second vibration modules 211, 212 are changed accordingly. In addition, the controller 180 may gradually increase or decrease the sum of vibrations output from the first and second vibration modules 211, 212 based on the number of touch inputs applied on the screen information 510.

Figure 4D:
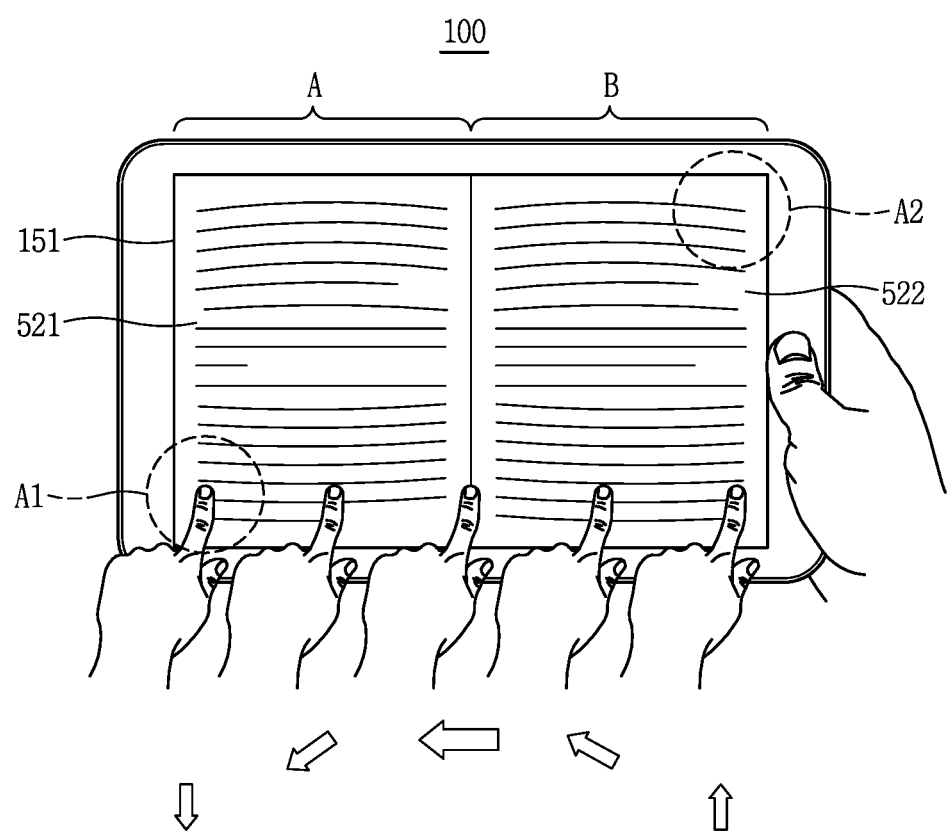

Referring to FIGS. 2A and 4D, the display unit 151 is divided into a first region A and a second region B, and a first image 521 and a second image 522 each indicating a page of a book are displayed on the first region A and the second region B. The display unit 151 is controlled to change the page of the book based on a touch applied to the first and second regions A, B. For example, if a touch input moving from the first region A to the second region B is applied, the display unit displays an image representing the previous page in the first and second regions A, B. When the touch input moving from the second region B to the first region A is applied, the display unit displays an image representing the next page in the first and second regions A, B.

Meanwhile, the first and the second vibration modules 211, 212 are disposed in the first region A1 and the second region A2, respectively. The first and second vibration modules 211, 212 vibrate in different directions.

The controller 180 outputs vibrations in directions opposite to each other based on a touch input continuously applied to the first and second regions A, B to display an image of the previous or the next page. The vibration intensity is the largest in the first and second regions A, B and the vibration intensity becomes smaller as it moves to edge regions.

When a touch input is sensed in one region adjacent to the edge regions of the display unit 151, the controller 180 outputs a relatively small intensity of vibration.

Accordingly, the user may feel like turning book pages as screen information is changed based on a touch input applied to the display unit 151 to display a vibration pattern for switching an image of each page.

Figure 5:
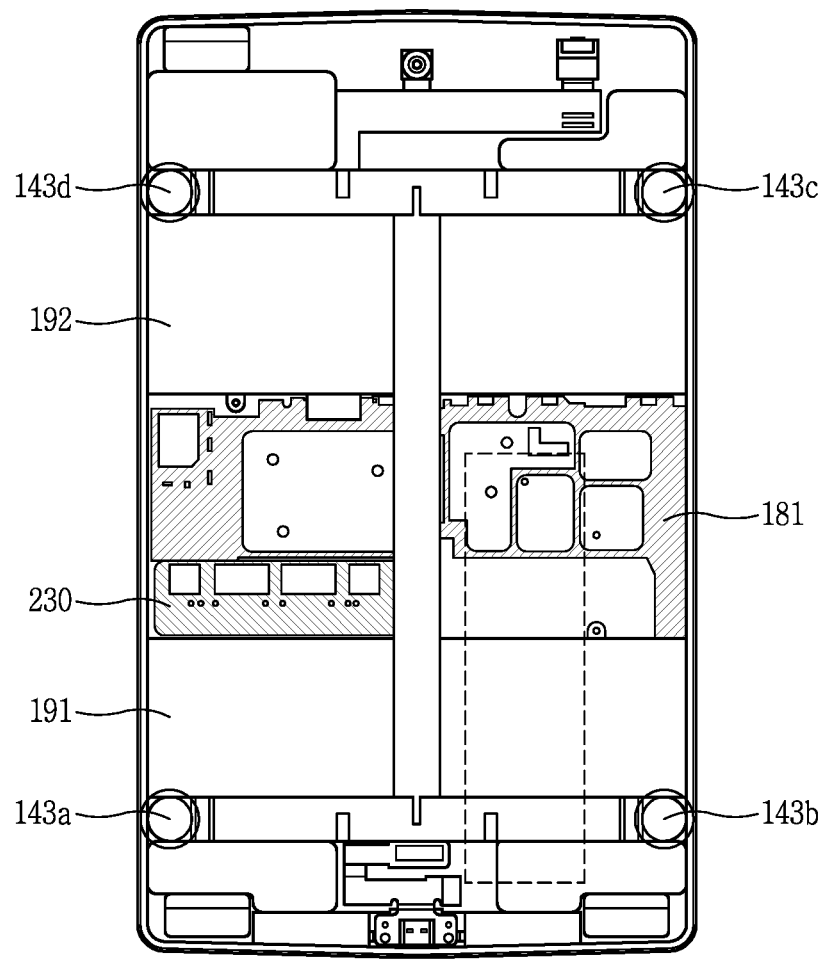
FIG. 5 is a conceptual view illustrating an arrangement structure of a vibration module disposed together with a pressure sensing sensor.

FIG. 5 is a conceptual view illustrating an arrangement structure of a vibration module disposed together with a pressure sensing sensor.

Referring to FIG. 5, first to fourth pressure sensors 143a, 143b, 143c, and 143d are disposed to be apart from each other. A circuit board 181 and first and second batteries 191, 192 may be disposed between the first to fourth pressure sensors 143a, 143b, 143c, and 143d arranged with respect to a central region of the display unit 151. A vibration module 230 is disposed on the circuit board 181 disposed between the first and second batteries 191, 192.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

INDUSTRIAL AVAILABILITY

Embodiments of the present invention can be applied to various industrial fields related thereto by proposing a mobile terminal having a plurality of haptic modules disposed therein.

The invention claimed is:
1. A mobile terminal, comprising:
a terminal body having a first direction as a length direction;
a circuit board arranged inside the terminal body and extending along the first direction;
first and second batteries arranged inside the terminal body so as to be spaced apart from each other with the circuit board interposed therebetween;
first and second vibration modules arranged so as to be adjacent to both ends of the circuit board;
a display unit divided into a first region and a second region; and
a controller configured to independently control the first and the second vibration modules,
wherein the first vibration module and the second vibration module are disposed at a position corresponding to the first region and the second region respectively, wherein the first vibration module is arranged in the first direction, and the second vibration module is arranged in a second direction intersecting the first direction, and wherein the controller controls the first vibration module to output a vibration based on a touch input continuously applied to the display unit along a specific direction from the first region to the second region.

2. The terminal of claim 1, wherein the first and second vibration modules are arranged in different directions.

3. The terminal of claim 2, wherein the controller controls the first and second vibration modules to output vibrations upon receiving a touch input from a boundary region between the first region and the second region.

4. The terminal of claim 3, wherein the controller changes an intensity of vibration output by the first and second vibration modules based on whether the touch input is received in the first region or the second region of the display unit.

5. The terminal of claim 2, wherein the display unit displays distinctive first and second images in the first region and the second region, respectively, and the controller changes the first and second images based on a touch input applied to at least one of the first region and the second region, and wherein the controller controls the first vibration module to output a vibration in a specific direction.

6. The terminal of claim 2, wherein the display unit displays specific screen information, and wherein the controller controls the first and second vibration modules to output vibrations of different intensities and directions based on a position and a direction of a touch input applied to the specific screen information.

7. The terminal of claim 1, wherein the controller controls the second vibration module to output a vibration when the continuous touch input is no longer movable in the second region.

8. The terminal of claim 1, wherein the first and second vibration modules are arranged in the first direction.

9. A mobile terminal, comprising:
a terminal body having a first direction as a length direction and provided with a front case forming an outer appearance;
a circuit board disposed in the terminal body and extending along the first direction;
a battery disposed in the terminal body with the circuit board interposed therebetween;
first and second vibration modules disposed adjacent to both ends of the circuit board;
a display unit divided into a first region and a second region; and
a controller configured to independently control the first and the second vibration modules,
wherein the first vibration module is disposed adjacent to the battery, and the second vibration module is disposed adjacent to the front case,
wherein the first vibration module and the second vibration module are disposed at a position corresponding to the first region and the second region respectively,
wherein the first vibration module is arranged in the first direction, and the second vibration module is arranged in a second direction intersecting the first direction, and
wherein the controller controls the first vibration module to output a vibration based on a touch input continuously applied to the display unit along a specific direction from the first region to the second region.

* * * * *